United States Patent
Fox et al.

(10) Patent No.: US 11,699,966 B1
(45) Date of Patent: Jul. 11, 2023

(54) OPEN FLYBACK DIODE PROTECTION

(71) Applicant: Hamilton Sundstrand Corporation, Charlotte, NC (US)

(72) Inventors: Brennan Fox, Machesney Park, IL (US); Adrian E. Vandergrift, Rockton, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/669,505

(22) Filed: Feb. 11, 2022

(51) Int. Cl.
*H02P 9/00* (2006.01)
*B64D 41/00* (2006.01)
*H02P 9/02* (2006.01)

(52) U.S. Cl.
CPC .............. *H02P 9/006* (2013.01); *B64D 41/00* (2013.01); *H02P 9/02* (2013.01)

(58) Field of Classification Search
CPC .................................. H02P 9/006; H02P 9/02
See application file for complete search history.

(56) References Cited

U.S. PATENT DOCUMENTS

| | | | |
|---|---|---|---|
| 3,389,326 | A | 6/1968 | Hyvarinen |
| 5,087,869 | A | 2/1992 | Kuriyama et al. |
| 7,196,498 | B2 | 3/2007 | Yao |
| 8,970,183 | B2 | 3/2015 | Maddali et al. |
| 10,027,267 | B2 | 7/2018 | Vandergrift |
| 10,516,357 | B2 | 12/2019 | Turvey |
| 10,651,838 | B2 | 5/2020 | Haugan |
| 2016/0380425 | A1 | 12/2016 | Chapman et al. |

*Primary Examiner* — Sean Gugger
(74) *Attorney, Agent, or Firm* — Cantor Colburn LLP (57) ABSTRACT

An exciter drive circuit comprises a direct current (DC) link to provide a positive DC voltage to a positive voltage exciter rail and a negative DC voltage to a negative voltage exciter rail. An exciter winding includes a first exciter terminal connected to the positive voltage exciter rail and an opposing second exciter terminal connected to the negative voltage exciter rail. A flyback circuit establishes a first flyback current path that conducts the current from exciter winding in response to an inductive flyback event. A flyback fault protection circuit establishes a second flyback current path that conducts the current from exciter winding in response to the inductive flyback event and a fault present in the flyback circuit. The second flyback current path delivers the current output by the exciter winding from the negative voltage exciter rail to the positive voltage exciter rail.

20 Claims, 3 Drawing Sheets

OPEN FLYBACK DIODE PROTECTION

BACKGROUND

Embodiments of the present disclosure are directed to aircraft power systems, and more specifically, to fault protection of an exciter drive circuit.

Aircrafts are known to implement a variable frequency generator, which includes a synchronous generator that generates an output voltage that is regulated by an exciter field current. The output voltage of the synchronous generator is regulated by a generator control unit (GCU), which in turn controls the exciter field current delivered to the exciter winding. The exciter field current in variable frequency generating systems is typically controlled by an exciter drive circuit that includes two solid state switches, such as for example MOSFET switches, which are simultaneously turned on and off via a pulse width modulated (PWM) signal that is sent to the gates of the switches. The duty cycle of the PWM signal is typically determined by a current loop circuit.

BRIEF DESCRIPTION

According to a non-limiting embodiment, an exciter drive circuit comprises a direct current (DC) link, an exciter winding, a flyback circuit, and a flyback fault protection circuit. The DC link includes a positive DC rail configured to provide a positive DC voltage to a positive voltage exciter rail, and a negative DC rail configured to provide a negative DC voltage to a negative voltage exciter rail. The exciter winding includes a first exciter terminal connected to the positive voltage exciter rail and an opposing second exciter terminal connected to the negative voltage exciter rail. The flyback circuit is interposed between the DC link and the exciter winding. The flyback circuit is configured to establish a first flyback current path that conducts the current from exciter winding in response to an inductive flyback event. The first flyback current path is configured to deliver the current output by the exciter winding from the negative voltage exciter rail to the positive DC rail and from the negative DC rail to the positive voltage exciter rail. The flyback fault protection circuit is interposed between the flyback circuit and the exciter winding. The flyback fault protection circuit is configured to establish a second flyback current path that conducts the current from exciter winding in response to the inductive flyback event and a fault present in the flyback circuit. The second flyback current path is configured to deliver the current output by the exciter winding from the negative voltage exciter rail to the positive voltage exciter rail.

In addition to one or more of the features described herein, or as an alternative, further embodiments may include a feature, wherein the first flyback current path includes a first segment that delivers the current from the negative voltage exciter rail to the positive DC rail and a second segment that delivers the current from the negative DC rail to the positive voltage exciter rail.

In addition to one or more of the features described herein, or as an alternative, further embodiments may include a feature, wherein the second flyback current path delivers the current from the negative voltage exciter rail to the positive voltage exciter rail.

In addition to one or more of the features described herein, or as an alternative, further embodiments may include a DC link capacitor including a first capacitor terminal connected to the positive DC rail and an opposing second capacitor terminal connected to the negative DC rail; a first metal oxide semiconductor field effect transistor (MOSFET) configured to deliver the positive DC voltage to the positive voltage exciter rail; and a second MOSFET configured to deliver the negative DC voltage to the negative voltage exciter rail.

In addition to one or more of the features described herein, or as an alternative, further embodiments wherein the flyback circuit comprises: a first flyback diode including a first cathode connected in common with the positive DC rail, a drain terminal of the first MOSFET and the first capacitor terminal, and including a first anode connected in common with the negative voltage exciter rail, a drain terminal of the second MOSFET and the second exciter terminal; and a second flyback diode having a second cathode connected in common with the positive voltage exciter rail, a source terminal of the first MOSFET and the first exciter terminal, and a second anode connected in common with the negative DC rail, a source terminal of the second MOSFET and the second capacitor terminal.

In addition to one or more of the features described herein, or as an alternative, further embodiments may include a feature, wherein the first flyback diode establishes the first segment of the first flyback current path from the negative voltage exciter rail to the positive DC rail, and the second flyback diode establishes the second segment of the first flyback current path from the negative DC rail to the positive voltage exciter rail.

In addition to one or more of the features described herein, or as an alternative, further embodiments may include a feature, wherein the fault includes an open-circuit established by one or both of the first flyback diode and the second flyback diode.

In addition to one or more of the features described herein, or as an alternative, further embodiments may include a feature, wherein the flyback fault protection circuit comprises: an over-voltage detector configured to compare an exciter voltage appearing across the exciter winding to a voltage threshold configured to indicate a presence of the inductive flyback event and to output a switch activation signal in response to the exciter voltage exceeding the voltage threshold; a flyback protection diode including a cathode connected to the positive voltage exciter rail, and a flyback protection switch including an input configured to receive the current from the exciter winding and an output configured to output the current to the flyback protection diode in response to receiving the switch activation signal.

In addition to one or more of the features described herein, or as an alternative, further embodiments may include a feature, wherein the over-voltage detector comprises: a positive voltage input terminal connected in common with the positive voltage exciter rail and the first exciter terminal; and a negative voltage input terminal connected in common with the negative voltage exciter rail and the second exciter terminal, wherein the over-voltage detector outputs the switch activation signal in response to the exciter voltage across the positive voltage input terminal and the negative voltage input terminal exceeding the voltage threshold.

In addition to one or more of the features described herein, or as an alternative, further embodiments may include a feature, wherein the flyback protection switch includes a source terminal (S) connected to the anode of the flyback protection diode, a drain terminal (D) connected in common with the negative voltage exciter rail and the second exciter terminal, and a gate terminal (G) configured to receive the switch activation signal.

In addition to one or more of the features described herein, or as an alternative, further embodiments may include a feature, wherein the over-voltage detector outputs the switch activation signal having a zero or negative voltage in response to the exciter voltage across the exciter winding being less than or equal to the voltage threshold such that the flyback protection switch is opened and the current output by the exciter winding is blocked from flowing through the second flyback current path, and wherein the over-voltage detector outputs the switch activation signal having a positive voltage in response to the exciter voltage across the exciter winding exceeds the voltage threshold such that the flyback protection switch is closed and the current output by the exciter winding flows through the second flyback current path from the negative voltage exciter rail to the positive voltage exciter rail.

In addition to one or more of the features described herein, or as an alternative, further embodiments may include a feature, wherein the flyback fault protection circuit comprises: a flyback protection diode including a cathode connected in common with the positive voltage exciter rail and the first exciter terminal; and a Zener diode including a Zener anode connected to an anode of the flyback protection diode and including a Zener cathode connected in common with the negative voltage exciter rail and the second exciter terminal.

In addition to one or more of the features described herein, or as an alternative, further embodiments may include a feature, wherein the Zener diode has a breakdown voltage that is equal to the voltage threshold.

In addition to one or more of the features described herein, or as an alternative, further embodiments may include a feature, wherein the Zener diode blocks current flow through the second flyback current path in response to the voltage across exciter winding being less than or equal to the voltage threshold, and wherein the Zener diode breaks down in response to the voltage across the exciter winding exceeding the voltage threshold such that current output by the exciter winding flows through the second flyback current path.

According to yet another non-limiting embodiment, a method is provided for performing flyback diode fault protection in an aircraft power system. The method comprises providing, by a direct current (DC) link, a positive DC voltage to a positive voltage exciter rail and a negative DC voltage to a negative voltage exciter rail. The method further comprises delivering electrical current through an exciter winding establishing, by a flyback circuit interposed between the DC link and an exciter winding, a first flyback current path that conducts the current from the exciter winding in response to an inductive flyback event. The method further comprises delivering, by the first flyback current path, the current output by the exciter winding from the negative voltage exciter rail to a positive DC rail of the DC link and from a negative DC rail of the DC link to the positive voltage exciter rail. The method further comprises establishing, by a flyback fault protection circuit interposed between the flyback circuit and the exciter winding, a second flyback current path that conducts the current from exciter winding in response to the inductive flyback event and a fault present in the flyback circuit. The method further comprises delivering, by the second flyback current path, the current output by the exciter winding from the negative voltage exciter rail to the positive voltage exciter rail.

In addition to one or more of the features described herein, or as an alternative embodiment, the method further comprises delivering, by a first segment of the first flyback current path, the current from the negative voltage exciter rail to the positive DC rail; and delivering, by a second segment of the first flyback current path, the current from the negative DC rail to the positive voltage exciter rail.

In addition to one or more of the features described herein, or as an alternative embodiment, the method further comprises delivering, by the second flyback current path, the current from the negative voltage exciter rail to the positive voltage exciter rail.

In addition to one or more of the features described herein, or as an alternative embodiment, the method further comprises delivering, by a first metal oxide semiconductor field effect transistor (MOSFET), the positive DC voltage to the positive voltage exciter rail; and delivering, by a second MOSFET, the negative DC voltage to the negative voltage exciter rail.

In addition to one or more of the features described herein, or as an alternative embodiment, the method further comprises establishing, by a first flyback diode, the first segment from the negative voltage exciter rail to the positive DC rail; and establishing, by a second flyback diode, the second segment from the negative DC rail to the positive voltage exciter rail.

In addition to one or more of the features described herein, or as an alternative embodiment, the method further comprises comparing, by an over-voltage detector, an exciter voltage appearing across the exciter winding to a voltage threshold configured to indicate a presence of the inductive flyback event; outputting, by the over-voltage detector, a switch activation signal in response to the exciter voltage exceeding the voltage threshold; delivering the current from exciter winding to an input of a flyback protection switch that includes a cathode connected to the positive voltage exciter rail; and in response to receiving the switch activation signal, outputting the current from the flyback protection switch to a flyback protection diode that includes a cathode connected to the positive voltage exciter rail.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The variable frequency generator included in an aircraft power system can generate high voltages and current, particularly when operating in the high frequency range. As a result, excessive current can build up in the exciter winding. When power supply to the exciter winding is suddenly reduced or removed, inductive flyback (sometimes simply referred to as "flyback") can occur, which causes an undesirable voltage spike that can cause arching and/or damage the switching transistors or other components in the GCU. This voltage spike occurs because the current flowing through the inductor is incapable of change quickly enough to dissipate the energy built up in the exciter winding.

One solution to prevent inductive flyback is to include a flyback diode in the exciter drive circuit. In the event of inductive flyback, the flyback diode provides an alternative current path (i.e., flyback current path) to conduct the current from exciter winding and sufficiently dissipate the energy built up in the exciter winding. The flyback diode, however, may be susceptible to faults that prevent establishing the flyback current path. For instance, the flyback diode can be inadvertently manufactured with a structural fault that prevents it from becoming forward biased should an inductive flyback event occur. As a result, the faulty flyback diode effects a virtual open-circuit preventing the establishment of the flyback current and enabling damage to the exciter drive circuit.

Various non-limiting embodiments of the present disclosure provide an exciter circuit that includes a flyback circuit, along with a flyback protection circuit. The flyback protection circuit is configured to provide an alternative current path should the flyback circuit experience a fault during an inductive flyback event. Should a flyback diode included in the flyback circuit experience an open-circuit fault and disconnect the flyback current path, the flyback protection circuit is capable of establishing a second flyback current path that allows the exciter winding to output its current.

Figure 1:
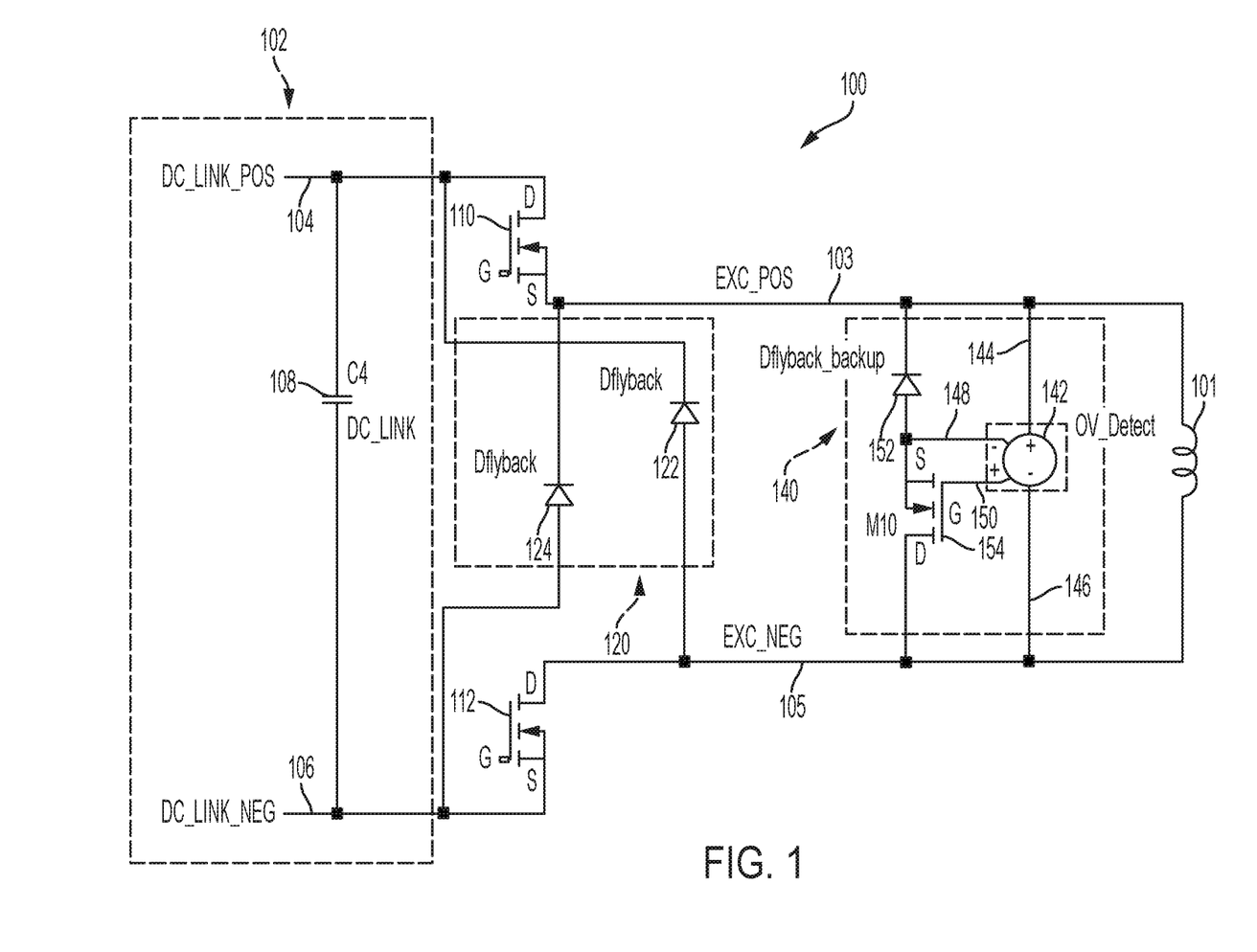
FIG. 1 is a schematic illustration of an exciter drive circuit including an open flyback diode protection circuit according to a non-limiting embodiment of the present disclosure.

Turning now to FIG. 1, an exciter drive circuit 100 including a flyback protection circuit 140 is illustrated according to a non-limiting embodiment of the present disclosure. The exciter drive circuit 100 includes an exciter winding 101, a direct current (DC) link 102, a first metal oxide semiconductor field effect transistor (MOSFET) 110, a second MOSFET 112, a flyback circuit 120, and a flyback fault protection circuit 140. As described herein, the flyback fault protection circuit 140 is configured to provide an alternative current path should the flyback circuit 120 experience a fault during an inductive flyback event.

The DC link 102 includes a positive DC rail 104, a negative DC rail 106, and a DC link capacitor 108. The positive DC rail 104 is configured to receive a positive DC voltage. The negative DC rail 106 is configured to receive a negative DC voltage. The positive DC voltage and negative DC voltage are applied to positive and negative exciter rails 103 and 105, respectively, using the first and second MOSFETs 110 and 112 which are discussed further below. The DC link capacitor 108 has a first terminal connected to the positive DC rail 104 and an opposing second terminal connected to the negative DC rail 106. The DC link capacitor 108 is capable of preventing transients originating from the exciter winding 101. The DC link capacitor 108 is also capable of smoothing the DC voltage signal applied across the positive and negative DC rails 104 and 106.

The exciter winding 101 has a first exciter terminal that is connected to the positive voltage exciter rail 103 and an opposing second exciter terminal that is connected to the negative voltage exciter rail 105. The exciter winding 101 is receives electrical current flowing from the positive voltage exciter rail 103 to the negative voltage exciter rail 105 to generate an electromagnetic field. Accordingly, the electromagnetic field can be utilized to energize an armature winding (not shown) included in an aircraft power system.

The first MOSFET 110 is connected between the positive DC rail 104 and the positive voltage exciter rail 103. The first MOSFET 110 includes a first drain terminal (D), a first source terminal (S) and a first gate terminal (G). The first drain terminal is connected in common with the positive DC rail 104 and the first terminal of the DC link capacitor 108. The first source terminal (S) is connected in common with the positive voltage exciter rail 103 and the first exciter terminal. The first gate terminal (G) is configured to receive a pulse width modulated (PWM) signal output from a controller (not shown).

The second MOSFET 112 is connected between the negative DC rail 106 and the negative voltage exciter rail 105. The second MOSFET 112 includes a second drain terminal (D), a second source terminal (S), and a second gate terminal (G). The second drain terminal (D) is connected in common with the negative voltage exciter rail 105 and the second exciter terminal. The second source terminal (S) is connected in common with the negative rail 106 and the second terminal of the DC link capacitor 108. The second gate terminal (G) is configured to receive a PWM signal output from a controller.

The first and second MOSFETs 110 and 112 are configured to continuously switch on and off to deliver the positive and negative DC voltages from the positive and negative DC rails 104 and 106 to the positive and negative voltage exciter rails 103 and 105. The first and second MOSFETs 110 and 112 are switched according to a switching frequency in response to receiving the PWM signal. The frequency of the PWM signal sets the switching frequency of the first and second MOSFETs 112 and 114. In one or more non-limiting embodiments, the first and second MOSFETs 110 and 112 are switched according to a common switching frequency. Therefore, the first and second MOSFETs 112 and 114 are switched on at the same time and switched off at the same time.

The flyback circuit 120 is interposed between the DC link 102 and the exciter winding 101. The flyback circuit 120 is configured to establish a first flyback current path for receiving the current from exciter winding 101 in response to an inductive flyback event. According to a non-limiting embodiment, the first flyback current path delivers current from the negative voltage exciter rail 105 to the positive DC rail 104 and current from the negative DC rail 106 to the positive voltage exciter rail 103.

According to a non-limiting embodiment, the flyback circuit 120 includes a first flyback diode 122 and a second flyback 124. The first flyback diode 122 includes a first cathode and a first anode. The first cathode is connected in common with the positive DC rail 104, the first drain terminal and the first terminal of the DC link capacitor 108. The first anode is connected in common with the negative voltage exciter rail 105, the second drain terminal of the second MOSFET 112 and the second exciter terminal. The second flyback diode 124 includes a second cathode and a second anode. The second cathode is connected in common with the positive voltage exciter rail 103, the first source terminal of the first MOSFET 110 and the first exciter terminal. The second anode is connected in common with the negative DC rail 106, the second source terminal of the second MOSFET 112 and the second terminal of the DC link capacitor 108.

The arrangement of the flyback circuit 120 allows the first flyback diode 122 to establish a first segment of the first flyback current path from the negative voltage exciter rail 105 to the positive DC rail 104, while allowing the second flyback diode 124 to establish a second segment of the first flyback current path from the negative DC rail 106 to the positive voltage exciter rail 103. During an inductive flyback event for example, the exciter winding 101 will output the current to the negative voltage exciter rail 105. From the negative voltage exciter rail 105, the current flows through the first flyback diode 122 and is delivered to the positive DC rail 104. The current then flows through the DC link capacitor 108 and is delivered to the negative DC rail 106. From the negative DC rail 106, the current flows through the second flyback diode 124 and is returned to the positive DC rail 104. Accordingly, the first flyback current path provided enough time for the GCU to adjust the switching frequencies of the first and second MOSFETS 110 and 112 to remove the flyback event and prevent a voltage spike that may cause damage to the exciter drive circuit 100.

Figure 2:
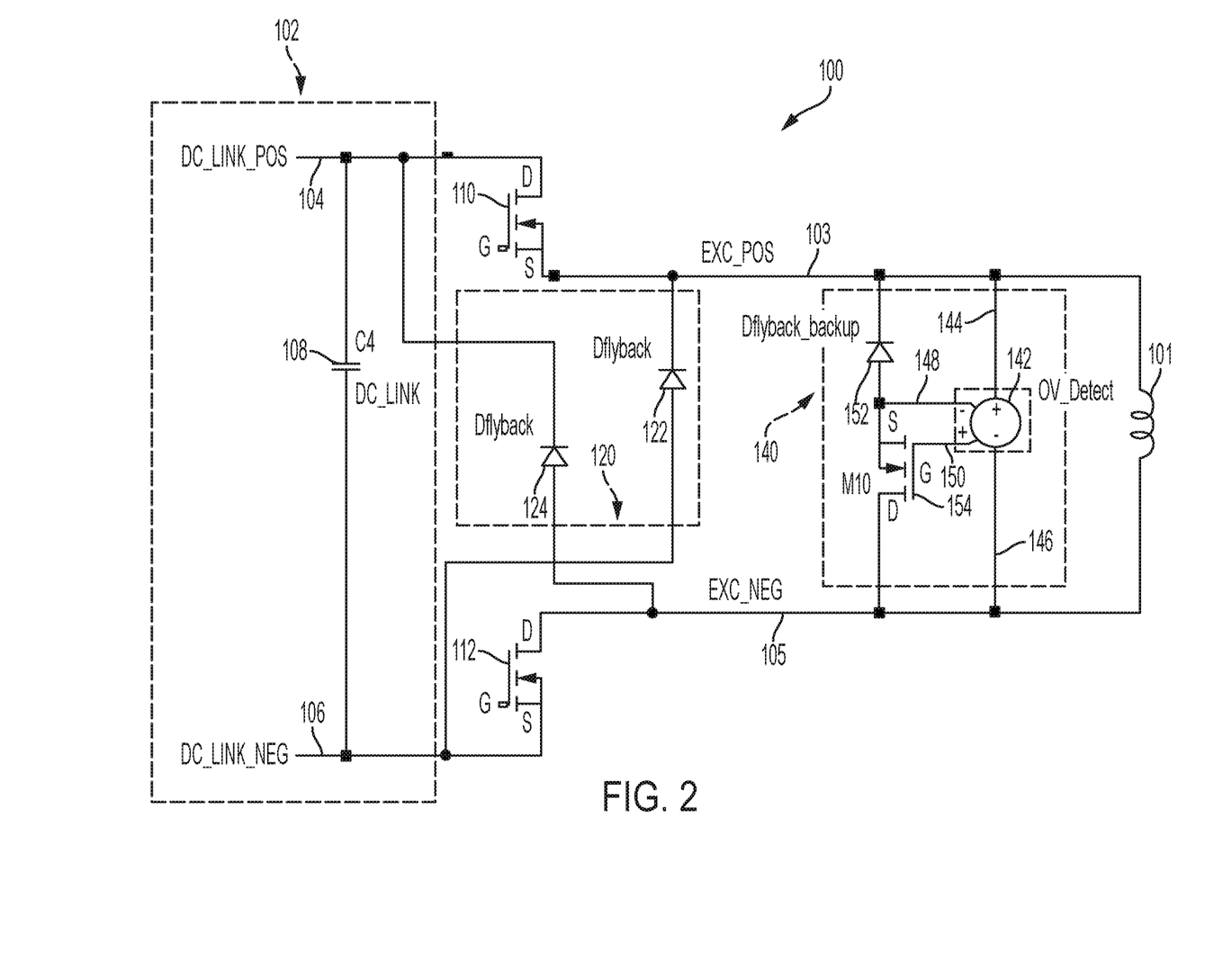
FIG. 2 is a schematic illustration of an exciter drive circuit including an open flyback diode protection circuit according to another non-limiting embodiment of the present disclosure.

According to another non-limiting embodiment illustrated FIG. 2, the first flyback diode 122 has a first cathode connected in common with the positive voltage exciter rail 103, the first source terminal of the first MOSFET 110 and the first exciter terminal, and a first anode connected in common with the negative DC rail 106, the second source terminal of the second MOSFET 112 and the second terminal of the DC link capacitor 108. The second flyback diode 124 has a second cathode connected in common with the positive DC rail 104, the first drain terminal of the first MOSFET 110 and the first terminal of the DC link capacitor 108, and a second anode connected in common with the negative voltage exciter rail 105, the second drain terminal of the second MOSFET 112 and the second exciter terminal. In this arrangement, the second flyback diode 124 establishes the first segment of the first flyback current path from the negative voltage exciter rail 105 to the positive DC rail 104, while the first flyback diode 122 establishes the second segment of the first flyback current path from the negative DC rail 106 to the positive voltage exciter rail 103.

Returning to FIG. 1, the flyback fault protection circuit 140 is interposed between the flyback circuit 120 and the exciter winding 101. The flyback fault protection circuit 140 is connected in parallel with the exciter winding 101 and is configured to establish a second flyback current path in response to the flyback event. As described herein, the flyback fault protection circuit 140 protects the exciter drive circuit 100 from damage should the flyback circuit 120 contain a fault (e.g., an open diode) by establishing a second flyback current path capable of receiving current from the exciter winding 101 during a flyback event. For example, the flyback fault protection circuit 140 can be established when a fault occurs with the flyback circuit 120 and/or any other components involved that would result in the flyback circuit 120 not providing a flyback path to recycle the current from the exciter field 101.

According to a non-limiting embodiment illustrated in FIG. 1, the flyback fault protection circuit 140 includes an over-voltage detector 142, a flyback protection diode 152, and a flyback protection switch 154. The flyback protection switch 154 includes an input configured to receive the current from the exciter winding 101 and an output configured to deliver the current to the flyback protection diode 152. The over-voltage detector 142 can include a comparator circuit, for example, which compares the voltage across the exciter winding 101 to a voltage threshold indicating the presence of a flyback event. When the voltage exceeds the voltage threshold, the over-voltage detector 142 outputs a positive voltage, which serves as a switch activation signal that switches on (e.g., closes) the flyback protection switch 154, thereby enabling the second flyback current path. Accordingly, the exciter winding 101 is able to output current to the negative voltage exciter rail 105, which in turn flows through the closed a flyback protection switch 154 and the forward-biased flyback protection diode 152 before reaching the positive voltage exciter rail 103. In this manner, energy stored in the exciter winding 101 can be dissipated despite a fault in the flyback circuit 120 that disconnects the first flyback current path.

According to a non-limiting embodiment, the over-voltage detector 142 includes a positive voltage input terminal 144 connected in common with the positive voltage exciter rail 103 and the first exciter terminal, and a negative voltage input terminal 146 connected in common with the negative voltage exciter rail 105 and the second exciter terminal. The over-voltage detector 142 is configured to generate an output voltage across a first output voltage terminal 148 and a second output voltage terminal 150 based on the voltage across the first and second exciter terminals of the exciter winding 101.

The flyback protection diode 152 includes a cathode connected in common with the positive voltage exciter rail 103, the first exciter terminal and the positive voltage input terminal 144 of the over-voltage detector 142. The anode of the flyback protection diode 152 is connected to the first output voltage terminal 148.

The flyback protection switch 154 can include, for example, a MOSFET. The source terminal (S) is connected in common with the anode of the flyback protection diode 152 and the first output voltage terminal 148 of the over-voltage detector 142. The drain terminal (D) is connected in common with the negative voltage exciter rail 105, second exciter terminal and the negative voltage input terminal 146. The gate terminal (G) is connected to the second output voltage terminal 150 of the over-voltage detector 142.

When the voltage across the exciter winding 101 is less than or equal to the voltage threshold, the over-voltage detector 142 outputs a positive voltage to the first output voltage terminal 148 and a negative voltage to the second output voltage terminal 150. Accordingly, the flyback protection switch 154 is switched off (e.g., opened) in response to gate terminal (G) receiving the negative voltage so as to block the current output by the exciter winding 101 from flowing through the second flyback current path. However, when the voltage across the exciter winding 101 exceeds the voltage threshold, the over-voltage detector 142 outputs a negative voltage to the first output voltage terminal 148 and a positive voltage to the second output voltage terminal 150. Accordingly, the flyback protection switch 154 is switched on (e.g., closed) in response to gate terminal (G) receiving the positive voltage such that the current output by the exciter winding flows through the second flyback current path from the negative voltage exciter rail 105 to the positive voltage exciter rail 103. In this manner, the flyback fault protection circuit 140 can protect the exciter drive circuit 100 during a flyback event should the flyback circuit 120 contain a fault, e.g., a faulty flyback diode that causes an open circuit in the first flyback current path.

Figure 3:
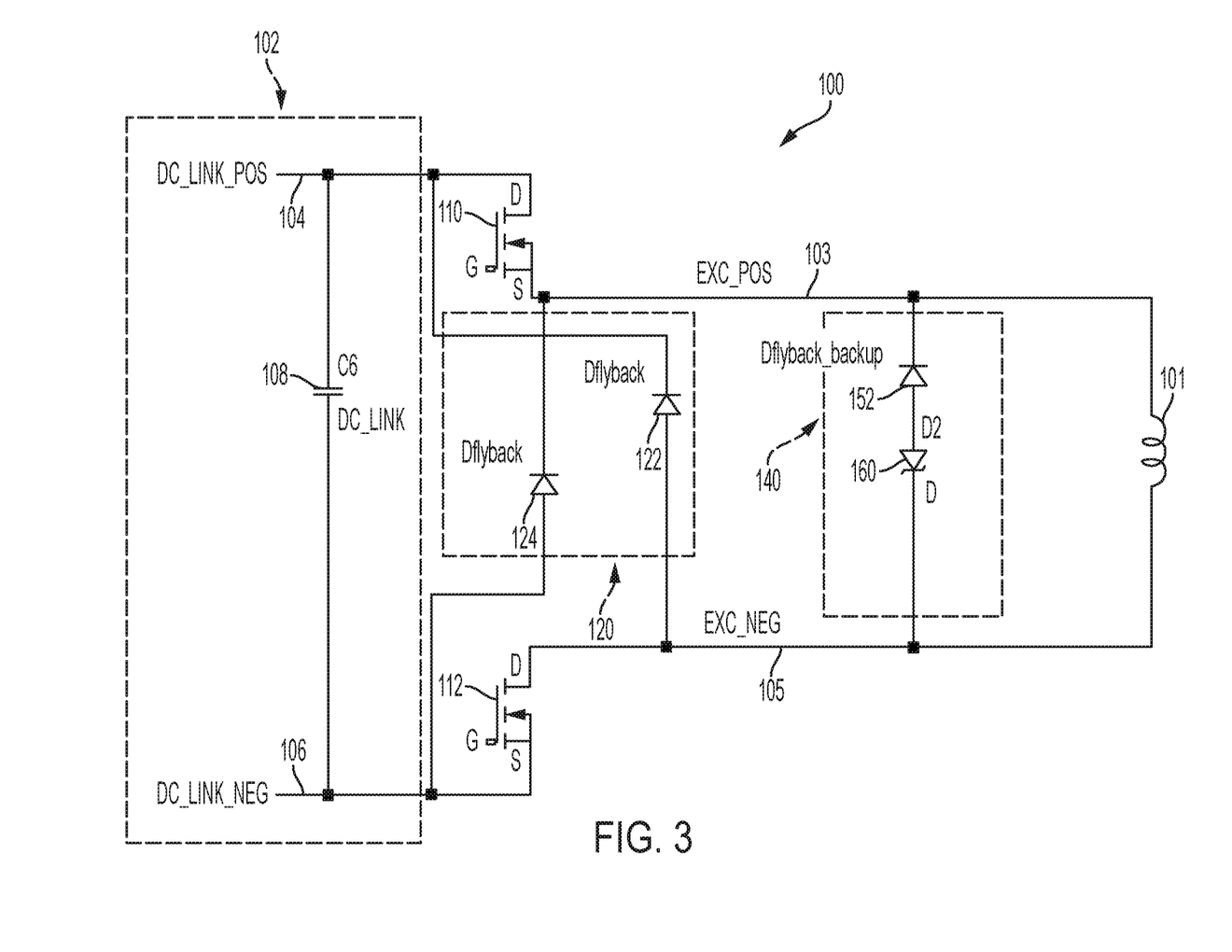
FIG. 3 is a schematic illustration of an exciter drive circuit including an open flyback diode protection circuit according to another non-limiting embodiment of the present disclosure.

Turning now to FIG. 3, the exciter drive circuit 100 includes a fault protection circuit 140 constructed according to another non-limiting embodiment. The fault protection circuit 140 includes a flyback protection diode 152 and a Zener diode 160. The cathode of the flyback protection diode 152 is connected in common with the positive voltage exciter rail 103 and the first exciter terminal of the exciter winding 101.

The Zener diode 160 includes an Zener anode and a Zener cathode. The anode connected to the anode of the flyback protection diode. The Zener cathode is connected in common with the negative voltage exciter rail 105 and the second exciter terminal. The Zener diode 160 is selected such that is has a breakdown voltage that is equal, or is substantially equal, to the voltage threshold used to indicate the presence of a flyback event in the exciter drive circuit 100.

The combination of the flyback protection diode 152 and the Zener diode 160 serve to selectively enable a second flyback current path capable of conducting current from the negative voltage exciter rail 105 to the positive voltage exciter rail 103. Accordingly, the second flyback path can be used to protect the 100 should the 120 contain a faulty flyback diode 122 and 124. For instance, the Zener diode 160 is configured to block current flow through the second flyback current path in response to the voltage across exciter winding 101 being less than or equal to the voltage threshold. When, however, the voltage across the exciter winding 101 exceeds the voltage threshold, the Zener diode 160 breaks down such that current output by the exciter winding flows from the negative voltage exciter rail 105, through the second flyback current path via the flyback diode 152, and to the positive voltage exciter rail 103.

Advantageously, various non-limiting embodiments of the present disclosure provide an exciter circuit that includes a flyback circuit, along with a flyback protection circuit. The flyback protection circuit is configured to provide an alternative current path should the flyback circuit experience a fault during an inductive flyback event. Should a flyback diode included in the flyback circuit experience an open-circuit fault and disconnect the flyback current path, the flyback protection circuit is capable of establishing a second flyback current path that allows the exciter winding to output its current.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ± 8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed as:

1. An exciter drive circuit comprising:
    a direct current (DC) link including a positive DC rail configured to provide a positive DC voltage to a positive voltage exciter rail, and a negative DC rail configured to provide a negative DC voltage to a negative voltage exciter rail;
    an exciter winding including a first exciter terminal connected to the positive voltage exciter rail and an opposing second exciter terminal connected to the negative voltage exciter rail;
    a flyback circuit interposed between the DC link and the exciter winding, the flyback circuit configured to establish a first flyback current path that conducts the current from exciter winding in response to an inductive flyback event, the first flyback current path configured to deliver the current output by the exciter winding from the negative voltage exciter rail to the positive DC rail and from the negative DC rail to the positive voltage exciter rail; and
    a flyback fault protection circuit interposed between the flyback circuit and the exciter winding, the flyback fault protection circuit configured to establish a second flyback current path that conducts the current from exciter winding in response to the inductive flyback event and a fault present in the flyback circuit, the second flyback current path configured to deliver the current output by the exciter winding from the negative voltage exciter rail to the positive voltage exciter rail.

2. The exciter drive circuit of claim 1, wherein the first flyback current path includes a first segment that delivers the current from the negative voltage exciter rail to the positive DC rail and a second segment that delivers the current from the negative DC rail to the positive voltage exciter rail.

3. The exciter drive circuit of claim 2, wherein the second flyback current path delivers the current from the negative voltage exciter rail to the positive voltage exciter rail.

4. The exciter driver circuit of claim 3, further comprising:
    a DC link capacitor including a first capacitor terminal connected to the positive DC rail and an opposing second capacitor terminal connected to the negative DC rail;
    a first metal oxide semiconductor field effect transistor (MOSFET) configured to deliver the positive DC voltage to the positive voltage exciter rail; and
    a second MOSFET configured to deliver the negative DC voltage to the negative voltage exciter rail.

5. The exciter drive circuit of claim 4, wherein the flyback circuit comprises:
    a first flyback diode including a first cathode connected in common with the positive DC rail, a drain terminal of the first MOSFET and the first capacitor terminal, and including a first anode connected in common with the negative voltage exciter rail, a drain terminal of the second MOSFET and the second exciter terminal; and
    a second flyback diode having a second cathode connected in common with the positive voltage exciter rail, a source terminal of the first MOSFET and the first exciter terminal, and a second anode connected in common with the negative DC rail, a source terminal of the second MOSFET and the second capacitor terminal.

6. The exciter drive circuit of claim 5, wherein the first flyback diode establishes the first segment of the first flyback current path from the negative voltage exciter rail to the positive DC rail, and the second flyback diode establishes the second segment of the first flyback current path from the negative DC rail to the positive voltage exciter rail.

7. The exciter drive circuit of claim 6, wherein the fault includes an open-circuit established by one or both of the first flyback diode and the second flyback diode.

8. The exciter drive circuit of claim 7, wherein the flyback fault protection circuit comprises:
an over-voltage detector configured to compare an exciter voltage appearing across the exciter winding to a voltage threshold configured to indicate a presence of the inductive flyback event and to output a switch activation signal in response to the exciter voltage exceeding the voltage threshold;
a flyback protection diode including a cathode connected to the positive voltage exciter rail; and
a flyback protection switch including an input configured to receive the current from the exciter winding and an output configured to output the current to the flyback protection diode in response to receiving the switch activation signal.

9. The exciter drive circuit of claim 8, wherein the over-voltage detector comprises:
a positive voltage input terminal connected in common with the positive voltage exciter rail and the first exciter terminal; and
a negative voltage input terminal connected in common with the negative voltage exciter rail and the second exciter terminal;
wherein the over-voltage detector outputs the switch activation signal in response to the exciter voltage across the positive voltage input terminal and the negative voltage input terminal exceeding the voltage threshold.

10. The exciter drive circuit of claim 9, wherein the flyback protection switch includes a source terminal (S) connected to the anode of the flyback protection diode, a drain terminal (D) connected in common with the negative voltage exciter rail and the second exciter terminal, and a gate terminal (G) configured to receive the switch activation signal.

11. The exciter drive circuit of claim 9, wherein the over-voltage detector outputs the switch activation signal having a zero or negative voltage in response to the exciter voltage across the exciter winding being less than or equal to the voltage threshold such that the flyback protection switch is opened and the current output by the exciter winding is blocked from flowing through the second flyback current path, and
wherein the over-voltage detector outputs the switch activation signal having a positive voltage in response to the exciter voltage across the exciter winding exceeds the voltage threshold such that the flyback protection switch is closed and the current output by the exciter winding flows through the second flyback current path from the negative voltage exciter rail to the positive voltage exciter rail.

12. The exciter drive circuit of claim 7, wherein the flyback fault protection circuit comprises:
a flyback protection diode including a cathode connected in common with the positive voltage exciter rail and the first exciter terminal; and
a Zener diode including a Zener anode connected to an anode of the flyback protection diode and including a Zener cathode connected in common with the negative voltage exciter rail and the second exciter terminal.

13. The exciter drive circuit of claim 12, wherein the Zener diode has a breakdown voltage that is equal to the voltage threshold.

14. The exciter drive circuit of claim 13, wherein the Zener diode blocks current flow through the second flyback current path in response to the voltage across exciter winding being less than or equal to the voltage threshold, and wherein the Zener diode breaks down in response to the voltage across the exciter winding exceeding the voltage threshold such that current output by the exciter winding flows through the second flyback current path.

15. A method of performing flyback diode fault protection in an aircraft power system, the method comprising:
providing, by a direct current (DC) link, a positive DC voltage to a positive voltage exciter rail and a negative DC voltage to a negative voltage exciter rail;
delivering electrical current through an exciter winding establishing, by a flyback circuit interposed between the DC link and an exciter winding, a first flyback current path that conducts the current from the exciter winding in response to an inductive flyback event;
delivering, by the first flyback current path, the current output by the exciter winding from the negative voltage exciter rail to a positive DC rail of the DC link and from a negative DC rail of the DC link to the positive voltage exciter rail; and
establishing, by a flyback fault protection circuit interposed between the flyback circuit and the exciter winding, a second flyback current path that conducts the current from exciter winding in response to the inductive flyback event and a fault present in the flyback circuit; and
delivering, by the second flyback current path, the current output by the exciter winding from the negative voltage exciter rail to the positive voltage exciter rail.

16. The method of claim 15, further comprising:
delivering, by a first segment of the first flyback current path, the current from the negative voltage exciter rail to the positive DC rail; and
delivering, by a second segment of the first flyback current path, the current from the negative DC rail to the positive voltage exciter rail.

17. The method of claim 16, further comprising delivering, by the second flyback current path, the current from the negative voltage exciter rail to the positive voltage exciter rail.

18. The method of claim 17, further comprising:
delivering, by a first metal oxide semiconductor field effect transistor (MOSFET), the positive DC voltage to the positive voltage exciter rail; and
delivering, by a second MOSFET, the negative DC voltage to the negative voltage exciter rail.

19. The method of claim 18, further comprising:
establishing, by a first flyback diode, the first segment from the negative voltage exciter rail to the positive DC rail; and
establishing, by a second flyback diode, the second segment from the negative DC rail to the positive voltage exciter rail.

20. The method of claim 19, further comprising:
comparing, by an over-voltage detector, an exciter voltage appearing across the exciter winding to a voltage threshold configured to indicate a presence of the inductive flyback event;

outputting, by the over-voltage detector, a switch activation signal in response to the exciter voltage exceeding the voltage threshold;

delivering the current from exciter winding to an input of a flyback protection switch that includes a cathode connected to the positive voltage exciter rail; and in response to receiving the switch activation signal, outputting the current from the flyback protection switch to a flyback protection diode that includes a cathode connected to the positive voltage exciter rail.

* * * * *